United States Patent

[11] 3,529,556

[72] Inventor Jack E. Barnes
2315 Greenwood St., Pueblo, Colorado 81003
[21] Appl. No. 777,391
[22] Filed Nov. 20, 1968
[45] Patented Sept. 22, 1970

[54] BARBECUE FORGE
1 Claim, 2 Drawing Figs.
[52] U.S. Cl. .................................................. 110/1, 126/25
[51] Int. Cl. ...................................................... A47j 37/07
[50] Field of Search............................................ 110/1F, 3.5; 126/25, 25B; 99/421

[56] References Cited
UNITED STATES PATENTS
| | | | |
|---|---|---|---|
| 2,950,669 | 8/1960 | Terry | 126/25X |
| 3,266,478 | 8/1966 | Booth | 126/25 |
| 3,296,957 | 1/1967 | Gagnon et al | 126/25X |
| 3,347,220 | 10/1967 | Barbera | 126/25X |

Primary Examiner—Kenneth W. Sprague

ABSTRACT: This invention consists of a typical barbecue grill having a hood embodying a flat top in the center of which is located an opening over which is suitably secured an electrically activated air blower adapted to blow air down on the aforesaid barbecue grill when it is used in the usual manner by those experienced in the cooking art. The aforesaid air blower has an air inlet that is provided with a triangularly shaped cover plate that controls the amount of air entering the air blower.

Patented Sept. 22, 1970

3,529,556

INVENTOR
Jack E. Barnes

BARBECUE FORGE

This invention relates to both barbecue grills and to forges; still more particularly, to a combination of a barbecue grill and a forge which I personally call a barbecue forge.

It is the principal object of this invention to provide a barbecue forge on which one can rapidly bring charcoal briquets to a cooking temperature in a minimum of time and with a minimum of effort by means of an electrically activated air blower.

Another object of this invention is to provide a barbecue forge of the character herein described that can be assembled from nearly any existing barbecue grill having a hood and an electric motor driven air blower.

Still another object of this invention is to provide a barbecue forge of the character herein described, having a manually adjustable air intake that will control the intensity of the flow of air on the grill.

Other and further objects and advantages of this invention will appear in the following specification, and the novel features of the invention will be particularly pointed out in what I hereinafter claim.

In the drawing.

In the drawing, like parts are indicated by like reference numbers in the two views of the drawing.

Figure 1:
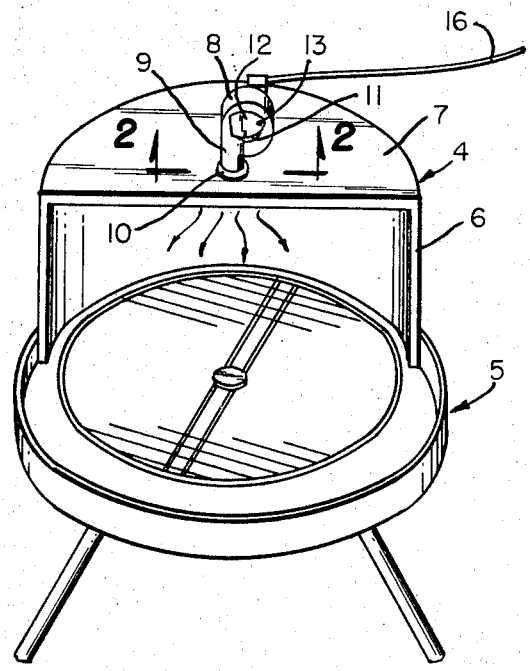
FIG. 1 is a perspective view of this invention.
Figure 2:
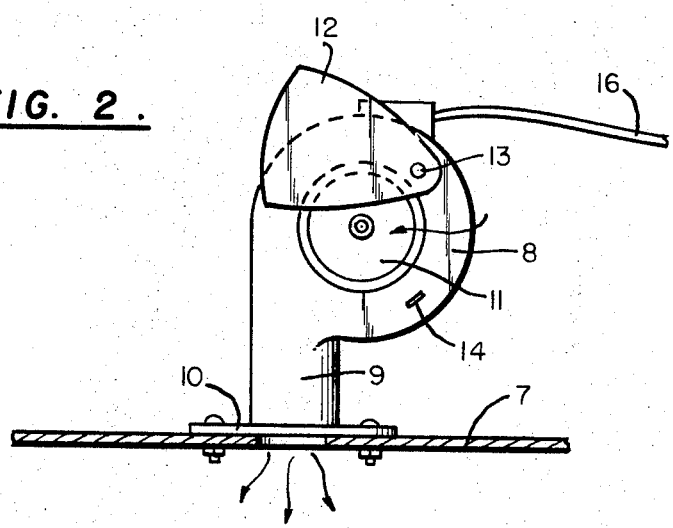
FIG. 2 is a sectional view of this invention, taken along line 2—2 of FIG. 1, and viewed in the direction indicated by the arrows.

This invention in its entirety is indicated by the reference number 4, and it consists of a typical barbecue grill 5 having a hood 6 that embodies a horizontally disposed flat surface 7 on which is mounted the air blower 8 that is activated by a built-in electric motor.

The aforesaid air blower 8 embodies a housing that has a vertically disposed tubular air outlet 9 which terminates in a horizontally disposed supporting flange 10 which is bolted or otherwise secured to the lateral center of the aforesaid flat surface 7 of the hood 6 over an opening in the flat surface 7, as one can see by examining the appended drawing.

The air inlet 11 of the aforesaid air blower 8 is provided with a triangular-shaped cover plate 12 that is swingably secured to the vertically disposed flat end surface of the blower casing by means of an adjusting screw 13 or its equivalent, thereby providing a means of controlling the amount of air that enters the air blower, as will be thoroughly understood by anyone having any experience in the mechanical arts. A stop member 14 projects outward from the lower portion of the aforesaid blower casing in order to prevent the aforesaid cover plate 12 from accidentally moving off the air inlet when the cover plate has been placed in a fully closed position.

Although not shown in any of the views of the drawing, the aforesaid air blower 8 is powered with an electric motor that is activated by a conveniently placed electric switch. The shaft of the electric motor is secured to a squirrel cage wind vane located within the housing of the air blower in order to create the necessary flow of air when the electric motor has been activated after its electric cord 16 has been connected to a suitable source of electricity.

This novel barbecue forge is used in the same manner that any barbecue grill is used except that one connects the electric cord 16 to a source of electricity and then activates the electric motor of the air blower 8 by the electric switch. The stream of air generated by the aforesaid air blower will intensify the temperature of the charcoal in the grill, thus increasing the cooking speed of the barbecue forge.

It is of course realized by those experienced in the art that the hood 6 can be dispensed with providing structure of any desired configuration is provided as a support for the blower 8. Also, that the aforesaid cover plate 12 can be of any desired shape and that the stop member 14 can be removed, if it is so desired.

This invention is subject to any and all changes and/or modifications in so long as the changes and/or modifications fall within the scope and intent of the appended claim.

I claim:

1. A barbecue forge of the character described, comprising a typical barbecue grill having a hood with a flat top, the top having an opening therein, an air blower which embodies a casing in which is located an electric motor having a shaft to which is secured a squirrel cage wind vane, an electric switch to control said motor and an electric cord connected to said motor which cord is to be connected to any suitable source of electric current, said casing in part formed with a vertically disposed tubular air outlet that has a lower end terminating in a horizontally disposed flange that is secured to the said hood by means of bolts or their equivalent, the said flange fitting over said opening in said flat top, said casing having a flat vertical surface which is provided with an air inlet opening for the blower, a triangular shaped cover plate, swingably secured to said flat vertical surface to cover at will said air inlet opening, a stop member secured to said flat vertical surface to prevent said cover plate from moving beyond a predetermined place on said flat surface.